United States Patent [19]

Audeh

[11] Patent Number: 4,985,137
[45] Date of Patent: * Jan. 15, 1991

[54] PROCESS FOR THE REMOVAL OF MERCURY FROM NATURAL GAS CONDENSATE

[75] Inventor: Costandi A. Audeh, Princeton, N.J.

[73] Assignee: Mobil Oil Corporation, Fairfax, Va.

[*] Notice: The portion of the term of this patent subsequent to Oct. 30, 2007 has been disclaimed.

[21] Appl. No.: 343,701

[22] Filed: Apr. 27, 1989

[51] Int. Cl.$^5$ .................. C01G 13/00; C07C 7/148; C10G 29/02
[52] U.S. Cl. .................. 208/251 H; 208/251 R; 208/293; 423/101; 585/811
[58] Field of Search .................. 423/210, 101, 102; 585/811, 826, 841, 856; 208/251 R, 251 H, 252, 253, 293

[56] References Cited

U.S. PATENT DOCUMENTS

| | | | |
|---|---|---|---|
| 2,905,636 | 9/1959 | Watkins et al. | 208/251 H |
| 4,044,098 | 8/1977 | Miller et al. | 423/210 |
| 4,430,206 | 2/1984 | Rankel | 208/252 |
| 4,764,219 | 8/1988 | Yan | 423/210 |
| 4,915,818 | 4/1990 | Yan | 208/251 R |

*Primary Examiner*—Jeffrey E. Russel
*Assistant Examiner*—Brian M. Bolam
*Attorney, Agent, or Firm*—Alexander J. McKillop; Charles J. Speciale

[57] ABSTRACT

A process for the removal of mercury from natural gas condensate wherein hydrogen sulfide is mixed into the natural gas condensate and the mixture is fed along with a stripping gas through a reactor containing a catalyst, e.g. a cobalt/molybdenum catalyst.

20 Claims, No Drawings

PROCESS FOR THE REMOVAL OF MERCURY FROM NATURAL GAS CONDENSATE

BACKGROUND OF THE INVENTION

The present application is directed to a process for the removal of impurities from natural gas condensate, and particularly, to a process for the removal of mercury from natural gas condensate.

Natural gas which is produced from a natural gas well is typically separated into components, which are in turn purified to provide products for a variety of end uses. The high-pressure mixture produced from the well, i.e., the wellstream, is typically sent to a separator vessel or a series of separator vessels maintained at progressively lower pressures where the wellstream is separated into a gaseous fraction and a liquid fraction.

The gaseous fraction leaving the separator, which may contain the impurities mercury, carbon dioxide and hydrogen sulfide, is sent to a gas treatment and purification plant where typically the mercury concentration is reduced to <0.1 micrograms/m$^3$, the $CO_2$ concentration is reduced to the parts per million (ppm) level, and the $H_2S$ to about one (1) ppm.

The liquid fraction is typically preheated, e.g., to 150° C., to affect partial vaporization and is then separated, for example, in a stabilizer column. In the upper section of the stabilizer column, the stream is rectified, i.e., the heavy hydrocarbons are removed from the vapor phase, and in the lower section of the stabilizer column, the liquid stream is stripped of its light hydrocarbon components. Complete stabilization can be further enhanced by heating the bottom liquid stream of the stabilizer column in a reboiler. The reboiler supplies additional heat in order to reduce the light hydrocarbon content of the liquid. The stabilizer column produces two streams, a stream which leaves the top of the stabilizer column containing low molecular weight hydrocarbons, e.g., $C_1$-$C_4$, and other gases and a stabilized condensate stream which leaves the bottom of the stabilizer column.

It has been found that the mercury in wellstreams from gas producing wells which contain mercury is partitioned among the gaseous and liquid streams. This mercury is thought to originate from the geologic deposits in which the natural gas is entrapped.

Typical steps for the processing of the liquid fraction of the wellstream do not reduce the amount of mercury in the liquid fraction leaving the separator. For example, a liquid fraction leaving the separator(s) having a mercury content of about 220 μg/kg(ppb) will yield a stabilized condensate containing about 220 μg/kg(ppb). The presence of this mercury in a natural gas condensate is undesirable and can cause damage to downstream processing equipment.

Equipment damage may result when mercury accumulates in equipment constructed of various metals, especially aluminum, by forming an amalgam with the metal. For example, in the production of ethylene, a natural gas condensate is commonly passed through a heat exchanger constructed of aluminum. Such equipment exists in the section of the ethylene manufacturing facilities where ethylene is separated from hydrogen, ethane and other hydrocarbons by chilling. It has been found that mercury tends to amalgamate with the aluminum of which the heat exchanger is constructed thereby creating the risk of corrosion cracking with potentially catastrophic results.

SUMMARY OF THE INVENTION

The present invention comprises a process for the removal of mercury from a natural gas condensate wherein hydrogen sulfide ($H_2S$) is mixed into the natural gas condensate and that mixture is then introduced into a reactor along with a stream of stripping gas such as methane ($CH_4$). The reactor contains a suitable catalyst, e.g. a cobalt/molybdenum (Co/Mo) catalyst. The present invention minimizes the risk of equipment failure by providing a process for the removal of mercury from natural gas condensates. Since the equipment required to practice the present invention commonly exists in the plants of end users of natural gas condensate, large capital expenditures may be unnecessary.

DETAILED DESCRIPTION OF THE INVENTION

In order to minimize the potential damage to expensive processing equipment which may result from the processing of natural gas condensate containing high levels of mercury, the present invention provides a simple and relatively inexpensive process for removing mercury from the natural gas condensate. It has been found that the amount of mercury in a natural gas condensate can be substantially reduced by the process of the present invention which comprises mixing hydrogen sulfide with the natural gas condensate and then passing this mixture into a reactor containing a catalyst along with a stripping gas such as $CH_4$, $N_2$, $H_2$, $C_2H_6$ or other inert gas such as argon or helium.

The catalyst may be any hydrodesulfurization (HDS) catalyst known in the art, for example, Co/Mo, Ni/Mo, etc. The catalyst can be formed in any conventional manner such as by depositing a cobalt/molybdenum salt on a solid support, impregnating the solid with aqueous solutions of the desired cobalt and molybdenum salts, and then evaporating the water to dry the catalyst. The solid can be any suitable solid for the forming of a cobalt/molybdenum catalyst, for example alumina, zirconia, silica-alumina, etc. Suitable catalysts typically have large surface areas, e.g., 200 square meters per gram, and large pores, preferably at least about 20 angstroms. Such cobalt/molybdenum catalysts are well known in the art and, therefore, will not be described further herein.

The $H_2S$ can be mixed with the natural gas condensate in any conventional manner such as by feeding the hydrogen sulfide gas and the condensate into an inline static mixer. The amount of $H_2S$ in the condensate can be relatively low, e.g., 10 ppm, and still successfully carry out the process of the present invention. Of course, the condensate can also be saturated with $H_2S$ and can contain, for example, 1% by weight.

In practicing the process of the present invention, the catalyst is placed in a conventional reactor, such as a carbon steel reactor, and the liquid condensate/hydrogen sulfide mixture as well as the stripping gas, are fed into the reactor and allowed to flow over the catalyst. During the practice of the present invention, the mercury in the condensate reacts with the hydrogen sulfide according to the following formula:

$$H_2S + Hg \rightarrow H_gS + H_2 \uparrow,$$

and the $H_gS$ is readily adsorbed by the catalyst.

The present invention advantageously operates successfully over a wide range of temperatures and pressures. The pressure in the reactor can be set from about 2 atmospheres to about 150 atmospheres and is preferably from about 3 to 10 atmospheres. The temperature in the reactor can range from about 100° C. to 300° C., and is preferably from about 210°-250° C. The space velocity, i.e. the volume of liquid flowing through the reactor every hour divided by the volume of the catalyst is preferably kept below about 20. Suitable feed ratios of the condensate-hydrogen sulfide mixture to the stripping gas also cover a wide range such as from 1:600 to 1:1200 and are preferably in the range of from about 1:600 to 1:750.

The stream leaving the reactor contains the natural gas condensate with a reduced amount of mercury, the stripping gas, and the $H_2S$. In order to separate these components, the pressure of the stream is reduced thereby allowing the stripping gas to leave the condensate. At this point in the process, the stripping gas serves to remove the non-reacted $H_2S$ from the condensate. In commercial production, the stripping gas may then be recycled or sent for further processing. It will also be appreciated by those skilled in the art that the stripping gas serves the additional function of facilitating the intermixing of the condensate and the $H_2S$.

As stated above, the stripping gas, which serves to remove the $H_2S$ from the condensate can be any suitable, gas which is non-reactive and inert with the other components under the stated process conditions such as methane, ethane, nitrogen, hydrogen, argon, helium, etc. Methane may be particularly suitable because it is often readily available in plants which use natural gas condensate.

While not always necessary, in one embodiment of the present invention, the catalyst is pre-sulfided before introducing the condensate-$H_2S$ mixture and/or stripping gas into the reactor. The catalyst can be pre-sulfided by preheating the catalyst to about 250°-400° C. and then passing an inert gas containing hydrogen sulfide, for example 4-5% by weight hydrogen sulfide, over the catalyst at atmospheric pressure.

It will appreciated by those skilled in the art that the natural gas condensate which is treated in accordance with the present invention typically comprise, in addition to mercury, trace amounts of nickel, vanadium, salt, moisture and sediment.

The process of the present invention has been successful in reducing the amount of mercury in natural gas condensate from above about 200 ppb to below about 20 ppb. It will be appreciated by those skilled in the art that the mercury content of the natural gas condensate can be determined by conventional methods, such as ASTM method D-3223.

The following examples will further illustrate the present invention.

EXAMPLE 1

About 150 gm of a natural gas condensate containing about 200 ppb mercury was saturated at atmospheric pressure with gaseous hydrogen sulfide. A cobalt-/molybdenum catalyst comprising 1 ml (about 0.8 gm) of alumina impregnated with cobalt/molybdenum salts which was previously sulfided was placed in a stainless steel reactor equipped with a means for temperature and pressure control, a means of heating, a methane supply, pumps and a recovery system.

Methane and the natural gas condensate-hydrogen sulfide mixture were introduced into the reactor at a pressure of 125 psig and a temperature of 266° C. The flow rates were:

Condensate mixture, 10 ml/hour, methane 120 ml/min.

The product leaving the reactor was a mixture of methane, hydrogen sulfide and treated condensate. This mixture was cooled to about −10° C. to ensure that the light hydrocarbons were not lost from the condensate and to recover the condensate for mercury determination. The gas was purified by removing the hydrogen sulfide with zinc oxide and sodium hydroxide and the purified gas was then vented.

The condensate, after the application of this treatment, had a mercury content of less than about 10 ppb.

EXAMPLE 2

A repeat of Example 1, but the reactor pressure was maintained at 100 psig. The natural gas condensate, after the application of this treatment, had a mercury content of about 16 ppb.

EXAMPLE 3

A repeat of Example 1, but the reactor pressure was maintained at 75 psig and the natural gas condensate feed rate was 8 ml/hour. The natural gas condensate, after the application of this treatment, had a mercury content of about 6 ppb.

EXAMPLE 4

A repeat of Example 1, but the reactor pressure was maintained at 50 psig. The natural gas condensate, after the application of this treatment, had a mercury content of about 16 ppb.

EXAMPLE 5

A repeat of Example 1, but the natural gas condensate which was first saturated with hydrogen sulfide was then diluted with condensate in the ratio of 1 part natural gas condensate saturated with hydrogen sulfide to 2 parts of condensate without any added hydrogen sulfide. The reactor pressure was maintained at 110 psig, and the flow rate of the condensate was 8 ml/hour and that of methane was 120 ml/min. The natural gas condensate, after the application of this treatment, had a mercury content of about 10 ppb.

EXAMPLE 6

A repeat of Example 5 but the temperature was reduced to 242° C. The natural gas condensate after the application of this treatment had a mercury content of about 10 ppb.

It will, therefore, be appreciated that the present invention provides a process for the removal of mercury for natural gas condensates. The present invention is particularly suited for removing mercury from small batches of natural gas condensate, for example, a tank car which has been shipped to an end user. Since the process of the present invention can be practiced using conventional equipment, e.g. hydroprocessing equipment, which is found in the plants of many end users of natural gas condensate, with only minor modifications, large capital expenditures may be avoided. The present invention thereby provides an economical process for the removal of mercury from natural gas condensate.

I claim:

1. A process for the removal of mercury from natural gas condensate comprising the steps of:

mixing hydrogen sulfide with said natural gas condensate, passing said mixture of natural gas condensate and hydrogen sulfide over a hydrodesulfurization catalyst in a reactor, and simultaneously passing a stripping gas over said catalyst.

2. A process according to claim 1 wherein said catalyst is a cobalt/molybdenum catalyst.

3. A process according to claim 1 wherein said catalyst is presulfided by passing hydrogen sulfide over said catalyst prior to passing said mixture and said stripping gas over said catalyst.

4. A process according to claim 1 wherein said reactor vessel is maintained at a pressure between about 2-150 atmospheres.

5. A process according to claim 1 wherein said reactor vessel is maintained at a pressure between about 3-10 atmospheres.

6. A process according to claim 1 wherein said reactor vessel is maintained at a temperature between about 100°-300° C.

7. A process according to claim 1 wherein said reactor vessel is maintained at a temperature between about 210°-250° C.

8. A process according to claim 1 wherein the volume of said condensate passing over said catalyst every hour divided by the volume of said catalyst is below about 20.

9. A process according to claim 1 wherein said mixture comprises between about 10 ppm-1% by weight hydrogen sulfide.

10. A process according to claim 1 wherein said mixture comprises between about 0.01-0.05% by weight hydrogen sulfide.

11. A process according to claim 1 wherein said stripping gas is selected from the group consisting of methane, ethane, and mixtures thereof.

12. A process according to claim 1 wherein said stripping gas is selected from the group consisting of hydrogen, nitrogen, and mixtures thereof.

13. A process according to claim 1 wherein said stripping gas is selected from the group consisting of argon, helium, and mixtures thereof.

14. A process for the removal of mercury from natural gas condensate comprising the steps of:

mixing hydrogen sulfide with said natural gas condensate, passing said mixture of natural gas condensate and hydrogen sulfide over a cobalt/molybdenum catalyst in a reactor while passing a stripping gas over said catalyst, and separating said natural gas condensate from said stripping gas outside of said reactor.

15. A process according to claim 14 wherein said reactor is maintained at a temperature between about 100°-300° C. and a pressure between about 2-150 atmospheres.

16. A process according to claim 14 wherein said reactor is maintained at a temperature between about 210°-250° C. and a pressure between about 3-10 atmospheres.

17. A process according to claim 14 wherein said catalyst is presulfided by passing hydrogen sulfide over said catalyst prior to passing said mixture and said stripping gas over said catalyst.

18. A process according to claim 14 wherein said stripping gas is selected from the group consisting of methane, ethane, and mixtures thereof.

19. A process according to claim 14 wherein said stripping gas is selected from the group consisting of hydrogen, nitrogen, and mixtures thereof.

20. A process according to claim 14 wherein said stripping gas is selected from the group consisting of argon, helium, and mixtures thereof.

* * * * *